(12) United States Patent
Gurda et al.

(10) Patent No.: US 8,122,502 B2
(45) Date of Patent: *Feb. 21, 2012

(54) DETECTING THE PRESENCE OF AN INSTALLATION ON A DATA PROCESSING SYSTEM BASED ON THE RELATIVE STORAGE LOCATIONS OF ONE OR MORE FILES

(75) Inventors: Melanie Gurda, Raleigh, NC (US); James S. Jennings, Durham, NC (US); Lenore Ramm, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 899 days.

This patent is subject to a terminal disclaimer.

(21) Appl. No.: 12/143,471

(22) Filed: Jun. 20, 2008

(65) Prior Publication Data
US 2008/0243839 A1 Oct. 2, 2008

Related U.S. Application Data

(63) Continuation of application No. 10/790,588, filed on Mar. 1, 2004, now Pat. No. 7,552,474.

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................... 726/22; 713/187
(58) Field of Classification Search ................... 726/22; 713/187
See application file for complete search history.

(56) References Cited

U.S. PATENT DOCUMENTS

| 6,049,799 | A | * | 4/2000 | Mangat et al. .................. 1/1 |
| 6,317,880 | B1 | | 11/2001 | Chamberlain et al. |
| 6,363,524 | B1 | | 3/2002 | Loy |

(Continued)

FOREIGN PATENT DOCUMENTS

EP 1202166 A1 5/2002

(Continued)

OTHER PUBLICATIONS

Melanie Gurda et al., U.S. Appl. No. 10/790,588, filed Mar. 1, 2004, Notice of Allowance, Feb. 17, 2009, 6 pages.

(Continued)

*Primary Examiner* — Benjamin Lanier
*Assistant Examiner* — Cordelia Zecher
(74) *Attorney, Agent, or Firm* — Marcia L. Doubet

(57) ABSTRACT

The presence of an installation on a data processing system may be detected by providing a signature that includes m files having paths associated therewith, respectively. A number n files on the data processing system are determined that match files in the signature and a files found ratio given by n/m is determined. A transformation is applied to the signature by replacing at least a portion of at least one of the paths with a new path. Then, a distance is determined between the n files on the data processing system and the m signature files. The distance corresponds to a sum of a number of path segments associated with the m signature files that cannot be matched to a corresponding path segment associated with files on the data processing system. The presence of the installation on the data processing system is determined based on the files found ratio and the distance.

18 Claims, 4 Drawing Sheets

U.S. PATENT DOCUMENTS

| | | |
|---|---|---|
| 6,425,126 B1 | 7/2002 | Branson et al. |
| 6,477,703 B1 | 11/2002 | Smith et al. |
| 6,493,871 B1 * | 12/2002 | McGuire et al. .............. 717/173 |
| 6,775,659 B2 * | 8/2004 | Clifton-Bligh ....................... 1/1 |
| 6,978,454 B2 * | 12/2005 | Singleton ...................... 717/175 |
| 7,552,474 B2 | 6/2009 | Gurda et al. |
| 2002/0188941 A1 | 12/2002 | Cicciarelli et al. |
| 2003/0014744 A1 | 1/2003 | Doll et al. |
| 2003/0046679 A1 | 3/2003 | Singleton |
| 2003/0050906 A1 * | 3/2003 | Clifton-Bligh .................. 707/1 |
| 2003/0051235 A1 | 3/2003 | Simpson |
| 2003/0084437 A1 | 5/2003 | Cashin et al. |
| 2005/0193216 A1 | 9/2005 | Gurda et al. |

FOREIGN PATENT DOCUMENTS

| | | |
|---|---|---|
| EP | 1202166 B1 | 8/2003 |
| JP | 11272451 | 10/1999 |

OTHER PUBLICATIONS

Huttenlocher et al., "Comparing Images Using the Hausdorf Distance", IEEE Transactions on Pattern Analysis and Machine Intelligence, 15(9): 850-863 (Sep. 1993).

* cited by examiner

DETECTING THE PRESENCE OF AN INSTALLATION ON A DATA PROCESSING SYSTEM BASED ON THE RELATIVE STORAGE LOCATIONS OF ONE OR MORE FILES

PRIORITY CLAIM

The present application is a continuation of U.S. patent application Ser. No. 10/790,588 filed on Mar. 1, 2004 and titled "Detecting The Presence Of An Installation On A Data Processing System Based On The Relative Storage Locations Of One Or More Files", now U.S. Pat. No. 7,552,474 B2, which is incorporated herein by reference in its entirety.

BACKGROUND OF THE INVENTION

The present invention relates to data processing methods, systems, and computer program products, and, more particularly, to data processing methods, systems, and computer program products for detecting the presence of an installation of software, documentation, Web site contents, and the like on a system.

When maintaining a data processing system, it may be desirable to determine what files have been installed on the system to facilitate diagnosing, monitoring, and/or repairing the data processing system. Unfortunately, few operating systems and/or other application software managers maintain an accurate registry of installed applications and/or files.

SUMMARY

According to some embodiments of the present invention, the presence of an installation on a data processing system may be detected by providing a signature that comprises m files having paths associated therewith, respectively. A number n files on the data processing system are determined that match files in the signature and a files found ratio given by n/m is determined. A transformation is applied to the signature by replacing at least a portion of at least one of the paths with a new path. Then, a distance is determined between the n files on the data processing system and the m signature files. The distance corresponds to a sum of a number of path segments associated with the m signature files that cannot be matched to a corresponding path segment associated with files on the data processing system. The presence of the installation on the data processing system is determined based on the files found ratio and the distance.

In other embodiments of the present invention, a determination is made whether the files found ratio is greater than a files found threshold. If the files found ratio is greater than the files found threshold, then the distance is determined and the presence of the installation is determined as described above; otherwise, these operations are not performed.

In still other embodiments of the present invention, the transformation is applied by selecting a transformation based on a path associated with one of the m signature files. Then, the distance is determined between the n files on the data processing system and the m signature files using the selected transformation. The foregoing operations of selecting the transformation and determining the distance between the n files on the data processing system and the m signature files using the selected transformation are repeated for each one of the m signature files. A transformation is applied to the signature that is associated with the smallest distance.

In still other embodiments of the present invention, if one of the m signature files matches a plurality of files on the data processing system, then the distance between the one of the m signature files and the plurality of matching files on the data processing system is a smallest distance between the one of the m signature files and any one of the plurality of matching files on the data processing system.

In still other embodiments of the present invention, the presence of the installation is determined by comparing the files found ratio to a files found threshold. The distance is compared to a distance threshold and the presence of the one or more files is recognized if the files found ratio exceeds the files found threshold and the distance is less than the distance threshold.

In still other embodiments of the present invention, the files found threshold is selected based on the number of signature files m and/or whether the installation has at least one file associated therewith whose installation is optional.

In still other embodiments of the present invention, the number n files on the data processing system that match files in the signature is determined by searching the data processing system to find a first file that matches a first one of the m signature files. The found file has a distance dmax associated therewith. The data processing system is searched to determine if another file that matches another one of the m signature files can be found within the distance dmax. The search of the data processing system is ended if the other file that matches the other one of the m signature files is found within the distance dmax. The distance dmax is updated with a value of a distance associated with the other file that matches the other one of the m signature files if the other file is not found within the distance dmax. The foregoing operations of searching the data processing system to determine if another file matches another one of the m signature files, ending the search, and updating the distance dmax are performed for each of the m signature files.

Although described primarily above with respect to method aspects of the present invention, it will be understood that the present invention may also be embodied as systems and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
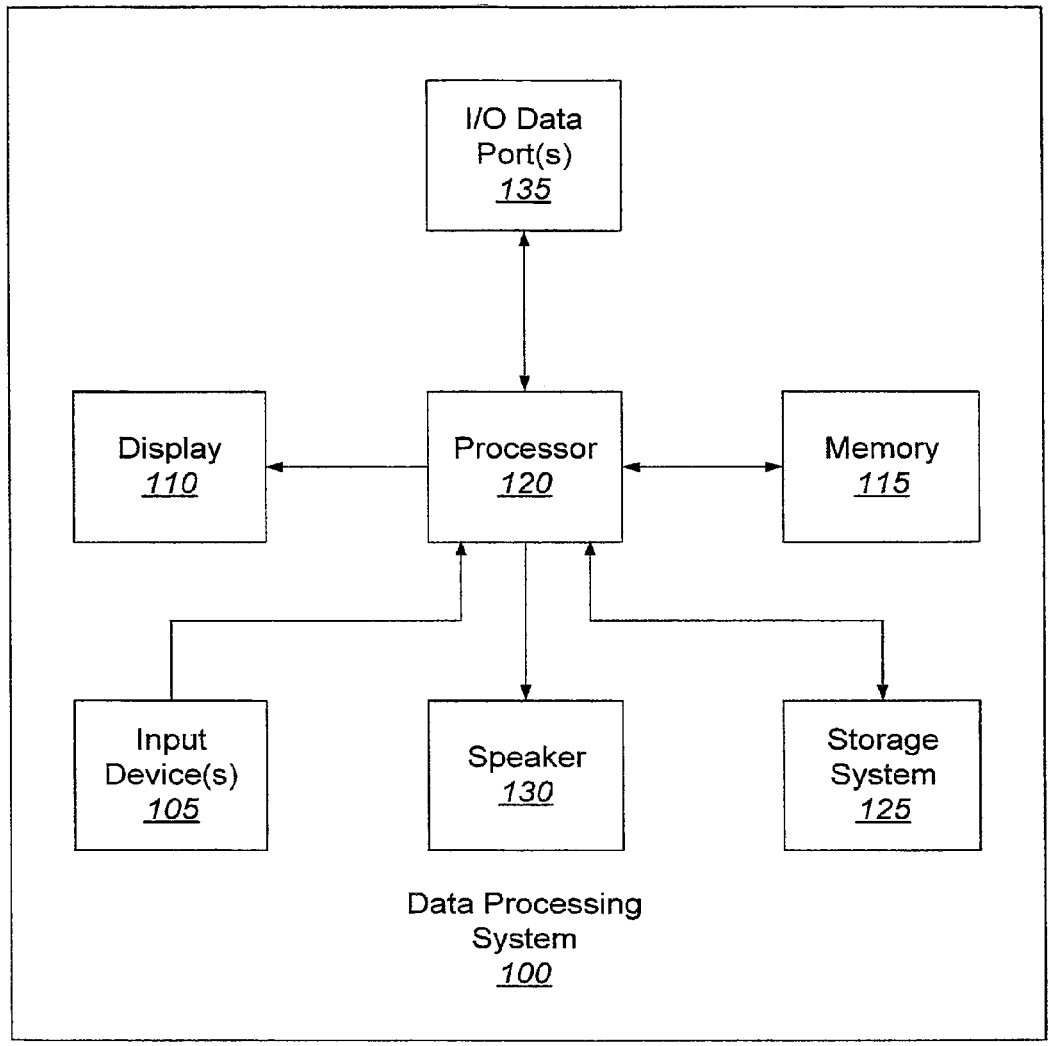
FIG. 1 is a block diagram that illustrates a data processing system in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described herein in the context of detecting an installation of software, documentation, Web site contents, data, or the like (generally referred to herein as an "installation") whose presence on a data processing system is observed by the presence of one or more files in a file system. As used herein, the term "file" refers to a complete named collection of information, such as a program, a set of data used by a program, and/or a user-created document. A file is a unit of storage that allows a data processing system or a computer to distinguish one set of information from another. Thus, a file may include, but is not limited to, such diverse items as software programs or applications, firmware programs or applications, documentation files, printer fonts, web files, and the like.

FIG. 1 illustrates a data processing system 100 that may be used to detect the presence of an installation thereon based on the relative storage locations of one or more files in accordance with some embodiments of the present invention. The data processing system 100 comprises input device(s) 105, such as a keyboard or keypad, a display 110, and a memory 115 that communicate with a processor 120. The data processing system 100 may further comprise a storage system 125, a speaker 130, and an I/O data port(s) 135 that also communicate with the processor 120. The storage system 125 may include removable and/or fixed media, such as floppy disks, ZIP drives, hard disks, or the like as well as virtual storage such as a RAMDISK. The I/O data port(s) 135 may be used to transfer information between the data processing system 100 and another computer system or a network (e.g., the Internet). These components may be conventional components, such as those used in many conventional computing devices, and their functionality, with respect to conventional operations, is generally known to those skilled in the art.

Figure 2:
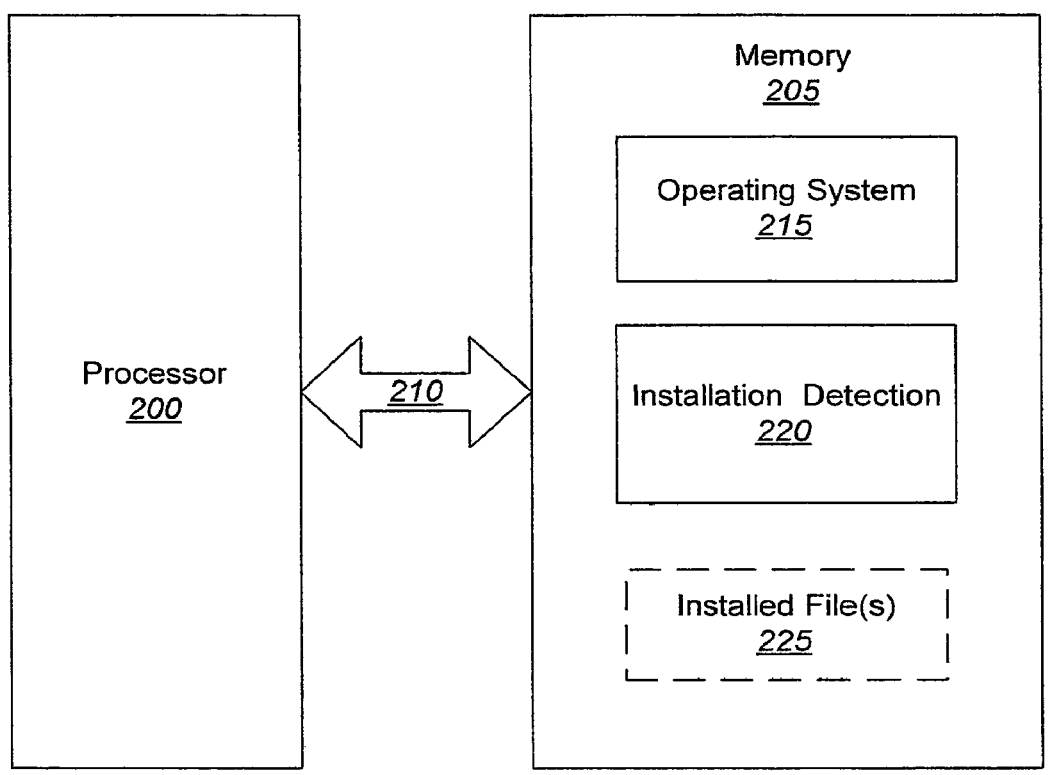
FIG. 2 is a block diagram that illustrates a software/hardware architecture for detecting the presence of an installation on the data processing system based on the relative storage locations of the files in accordance with some embodiments of the present invention.

FIG. 2 illustrates a processor 200 and memory 205 that may be used in embodiments of data processing systems, such as the data processing system 100 of FIG. 1, for detecting the presence of an installation based on the relative storage locations of one or more files in accordance with some embodiments of the present invention. The processor 200 communicates with the memory 205 via an address/data bus 210. The processor 200 may be, for example, a commercially available or custom microprocessor. The memory 205 is representative of the one or more memory devices containing the software and data used to facilitate the detection of an installation on the data processing system in accordance with some embodiments of the present invention. The memory 205 may include, but is not limited to, the following types of devices: cache, ROM, PROM, EPROM, EEPROM, flash, SRAM, and DRAM.

As shown in FIG. 2, the memory 205 may contain up to three or more categories of software and/or data: an operating system 215, an installation detection module 220, and potentially some installed file(s) 225 whose presence the installation detection module 220 may detect. The operating system 215 generally controls the operation of the data processing system. In particular, the operating system 215 may manage the data processing system's software and/or hardware resources and may coordinate execution of programs by the processor 200.

The installation detection module 220 may be configured to detect the presence of the installed file(s) 225 based on the relative storage locations of the file(s) comprising the installed file(s) 225 in accordance with some embodiments of the present invention. Operations for detecting the installed file(s) 225 will be described in detail hereinafter.

Although FIG. 2 illustrates exemplary hardware/software architectures that may be used in data processing systems, such as the data processing system 100 of FIG. 1, for detecting the presence of an installation on a data processing system, it will be understood that the present invention is not limited to such a configuration but is intended to encompass any configuration capable of carrying out operations described herein. Moreover, the functionality of the data processing system 100 of FIG. 1 and the hardware/software architecture of FIG. 2 may be implemented as a single processor system, a multi-processor system, or even a network of stand-alone computer systems, in accordance with various embodiments of the present invention.

Computer program code for carrying out operations of data processing systems discussed above with respect to FIG. 2 may be written in a high-level programming language, such as Java, C, and/or C++, for development convenience. In addition, computer program code for carrying out operations of the present invention may also be written in other programming languages, such such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Before describing operations for detecting the presence of an installation on a data processing system, in accordance with various embodiments of the present invention, some background concepts regarding distance and transformation of a "file(s) signature" will be briefly described.

The following definitions/notations are used herein:

Distance metric between points: d(a, b).

Distance metric between a point and a point set: d(a,b)= min {d(a,b) where b is in B}.

Directed Hausdorf distance, where A, B are point sets:

H(A,B)=max {d(a,B), where a is in A}, where d(a,B) is the metric distance from point a to the point set B.

The Hausdorf distance is defined as D(A,B)=max {H(A, B), H(B,A)}.

The following model may be used in accordance with some embodiments of the present invention: Point set A may be an installation model or installation signature that is known a priori and may be the subject of a search, for example, on a data processing system. Point set B may be features/components that are extracted from an "image" or file system. A search of point set B is performed in an attempt to find instances of point set A. A concept of transformation of a point set may be used in some embodiments of the present invention because an instance of point set A may be found in different locations in point set B.

When point sets A and B are point sets in a plane, for example, a commonly considered class of transformations are affine transforms, which account for translation, rotation, and scale. Thus, for point set matching in a plane, one approach may be to find the affine transformation T of of a point set A that minimizes d(T(A), B). In other words, determine how to transform the point set A to the feature set extracted from the image B so as to maximize the match (or minimize the error as measured by D).

When these principles are applied to detecting the presence of an installation on a data processing system, a class of transforms that may be used is one that maps directories in the installation signature to directories in the image or file system. It will be understood that the presence of an individual file and/or a set of individual files do not necessarily indicate that a particular file, file set, and/or application is installed. A set of files in particular locations relative to each other may, however, indicate the presence of a software application, for example, even though the application may be installed in different locations on different machines, the application may have individual components that are deployed to different locations on different machines, individual files may or may not be present in an installation due to varying features or service/fix packs that may or may not be applied, and/or file sizes may vary between installations due to varying features or service/fix packs that may or may not be applied.

In accordance with some embodiments of the present invention, a file name may be a feature classifier. That is, a file name on a data processing system must be identical to a file name in the file(s) signature to be considered a match. In other embodiments of the present invention, a distance between files may be computed, such as the Hamming distance on strings, if variations in file names are relevant to determining whether a software component, for example, is installed on a data processing system.

The following definitions are used herein in determining a distance between an installation signature and a set of files on a data processing system:

A file set F is a collection of individual files f. A file f is a tuple: (path, name). A file name is a string and a file path is an ordered sequence of strings, i.e., the hierarchical path that indicates a location in a file system. A file set F may be partitioned into a set of trees after projection onto the path subspace. For example, the projection of F onto the path subspace F|P may be partitioned into trees to yield a unique set of roots of F|P.

A transformation T on a path set F|P is a mapping on the roots of the trees formed by partitioning the path set. A path p may be transformed by T as follows:

p→T(p) if p is a root;

p→T(root(p))+tail(p)p) if p is a root, where root(p) is the root element of the path of the tree containing p, i.e., the first element in the path, and tail(p) is the rest of the path of p, and + is path concatenation.

For example, consider the set P={/a/b/c1, /a/b/c2, /x}. Partitioning P into sub-trees produces:

P=P1∪P2;
P1={/a/b/c1, /a/b/c2}
P2={/x}

The roots of P1 and P2 are /a and /x, respectively. An example transformation T on P may be as follows:

T(/a)→/new_a
T(/x)→/new_x/subdir

It follows that T(P) is:

$$T(/a/b/c1) \rightarrow T(/a) + /b/c1 = /\text{new\_a}/b/c1$$

$$T(/a/b/c2) \rightarrow T(/a) + /b/c2 = /\text{new\_a}/b/c2$$

$$T(/x) \rightarrow /\text{new\_x}/\text{subdir}$$

The concepts of applying a transformation to a path may also be applied to the space of file sets. Accordingly, the following definition is used herein:

T(F)={(T(p), n) where (p, n) is in F}

The distance between two files is defined only when the names of the files match and is defined in terms of a distance measure on paths. The distance between two files d(f1, f2) where f1=(p1, n1) and f2=(p2, n2) is defined when n1=n2 by string comparison. Let p1_i be the ith segment (string) of path p1 when counting from left to right. When p1 is shorter than p2, p1 may be normalized by extending it on the left with "./" until the number of segments in p1 equals that in p2. Let σ be a function on path segments (strings) that is defined as follows:

σ(s1, s2)={0 if s1=s2; otherwise 1}.

d_path (p1, p2)=sum {σ(p1_i, p2_i) for each path segment I in the normalized paths p1, p2}.

Because only one path may be extended in the normalization process and paths do not otherwise contain ".", the extended segments do not match their corresponding segments in the other path. Therefore each extension (each added "./") contributes 1 to the summation that defines d_path. The distance function in file space may, therefore, be written as follows:

d(f1, f2)=d_path(p1, p2) where f1=(p1, n1) and f2=(p2, n2).

Thus, according to some embodiments of the present invention, features are classified according to their file names. Distances are only computed for matching features, i.e., matching file names so the count of files that match in addition to the distance between the matching files may be used in detecting the presence of software on a data processing system in accordance with some embodiments of the present invention.

Based on the foregoing definitions, an installation may be detected on a data processing system, in accordance with some embodiments of the present invention, by providing an installation signature A, which comprises a set of files having paths associated therewith, respectively, and a data processing system contents B, which likewise is a set of files having paths associated therewith. A transformation may be found T that minimizes and/or reduces H(T(A), B) below a defined threshold. The metric H(T(A), B) may be referred to as structural similarity (ss). A files found (ff) ratio may be defined as n/size(A) where n is the number of elements (files) of A that are matched to elements of B.

In accordance with some embodiments of the present invention, a determination whether one or more files reside on a data processing system may be based on the directed Hausdorf distance, which measures the presence of the file(s) signature on the data processing system. In other embodiments of the present invention in which the installation signature and the data processing system contain a comparable number of files, an undirected Hausdorf distance may be used in which both the presence of the installation signature on the data processing system and the presence of the data processing system files in the installation signature are measured.

Thus, according to some embodiments of the present invention, the files found (ff) metric and/or the structural similarity (ss) metric may be used in deciding whether a particular installation has been found on a data processing system. For example, a files found threshold may be defined and the installation may not be considered present on the data processing system unless the files found threshold is exceeded in accordance with some embodiments of the present invention. The files found threshold may be based on the number of files that comprise the installation signature. If the installation signature includes a large number of files, then a files found threshold of about 20% may be sufficient. Alternatively, if the installation signature includes a few files, then a files found threshold of about 50% may produce more reliable results. Another factor that may be considered is whether a software application has features that may be optionally installed. When the number of optionally installed features is high, a larger number of individual files may or may not be present. In this case, a lower files found threshold may be more effective.

When a high value is computed for the structural similarity (ss), then the files were found on the system at a relatively large distance from the installation signature. Specifically, the files do not have the expected locations relative to each other. This could indicate a corrupt installation or perhaps a back-up directory that contains copies of some files. It could also indicate that the files and/or software that are detected are a different version from the one on which the installation signature is based. When a very low value is computed for the structural similarity (ss), then a match is indicated, i.e., the file(s) are considered detected on the data processing system. When a moderate value is computed for the structural similarity (ss), then a variant match may be variant match may be indicated in which some proportion of the files recognized were located in unexpected places, which may be the result of applying a fix-pack or installing/not-installing a feature.

Using standard statistical methods on real data, it may be possible to empirically determine values for the files found threshold and the structural similarity threshold. The distribution of values for the files found metric may be bimodal, with clustering at the high and low ranges. The high-value cluster may represent matches and the low-value cluster may represent, for example, software features/files commonly found in file systems irrespective of whether the file systems contain the file(s) defined by the installation signature. The distribution of values for structural similarity metric may comprise one or more low value clusters, which correspond to good matches in which individual directories may have different names in different installations, for example. The rest of the structural similarity values may be scattered across higher values, which represent the situations in which a few files from the installation signature are found in a file system, but are unrelated to the file(s) defined by the installation signature. Based on the foregoing, values for the files found threshold and the structural similarity threshold may be empirically chosen and used for a range of installation signatures. In some embodiments, some installation signatures may use specific files found and structural similarity thresholds. Heuristics for selecting these threshold values may be used and may be based on a combination of empirical data and knowledge about the particular file(s) being looked for, e.g., whether any optionally installed features are installed and how many such features exist.

Determining whether file(s) corresponding to an installation signature are found on a data processing system, according to some embodiments of the present invention, is based on finding the minimum distance between the installation signature files and the files found on the data processing system over a set of transformations. Fortunately, the set of all transformations need not be searched. According to some embodiments of the present invention, a sufficient set of transformation candidates may be derived using the paths of the installation signature files that are found on the data processing system. Thus, if an installation signature file x is found on the data processing system, then a candidate transformation is one that maps the path of x in the installation signature to its location in the data processing system. Candidate transformations may be derived for each installation signature file found on the data processing system. Other candidate transformations may be derived by shortening the target path.

The present invention is described herein with reference to flowchart and/or block diagram illustrations of methods, systems, and computer program products in accordance with exemplary embodiments of the invention. These flowchart and/or block diagrams further illustrate exemplary operations for detecting the presence of an installation on a data processing system, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
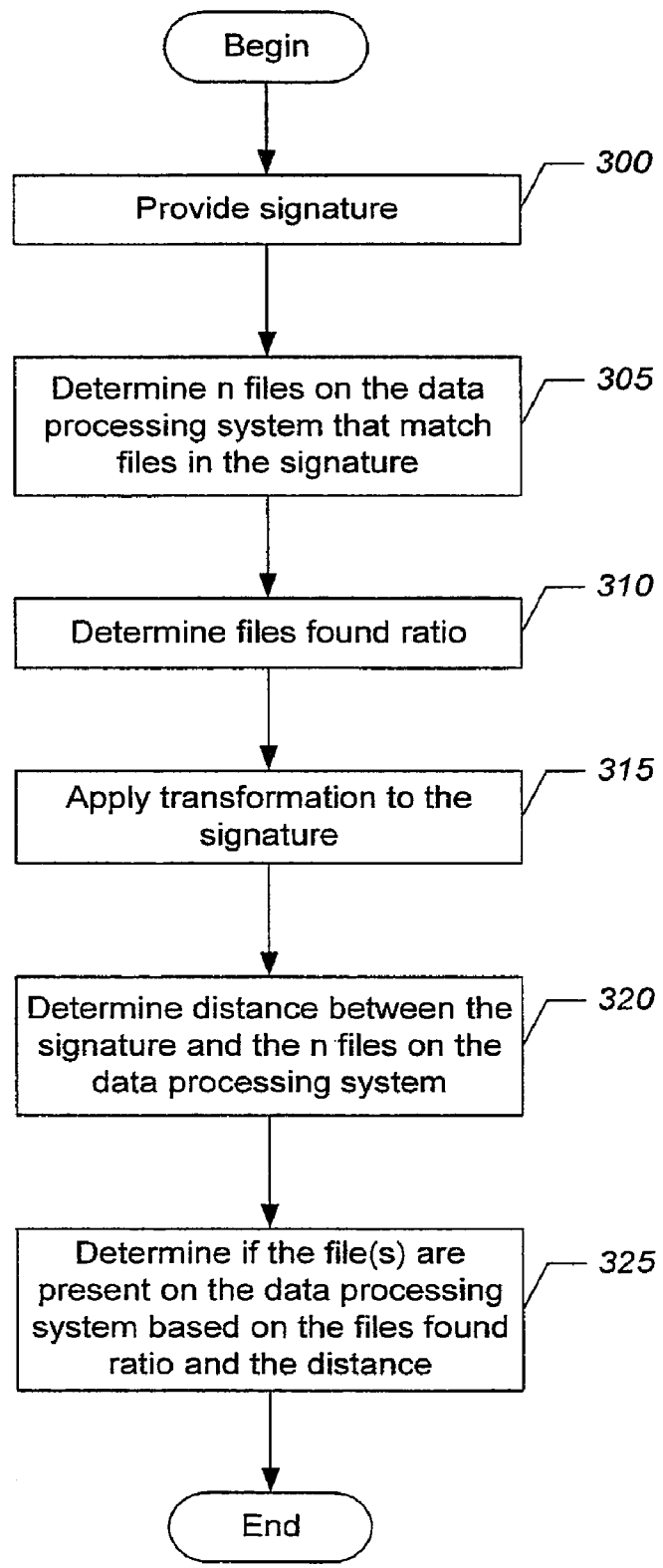
FIGS. 3 and 4 are flowcharts that illustrate operations for detecting the presence of an installation on a data processing system based on the relative storage locations of the files in accordance with some embodiments of the present invention.

Referring now to FIG. 3, exemplary operations for detecting the presence of an installation on a data processing system begins at block 300 where an installation signature is provided. The installation signature may comprise m files having paths associated therewith, respectively. At block 305, the data processing system is searched to determine n files that have file names that match the file names in the installation signature. A files found ratio given by n/m is determined at block 310. At block 315, a transformation is applied to the installation signature by replacing at least a portion of at least one of the paths of the installation signature files with a new path. A distance between the n files on the data processing system and the m files comprising the installation signature is determined at block 320 as discussed above. A determination of whether the file(s) are present is made at block 325 based on the files found ratio and the distance.

Figure 4:
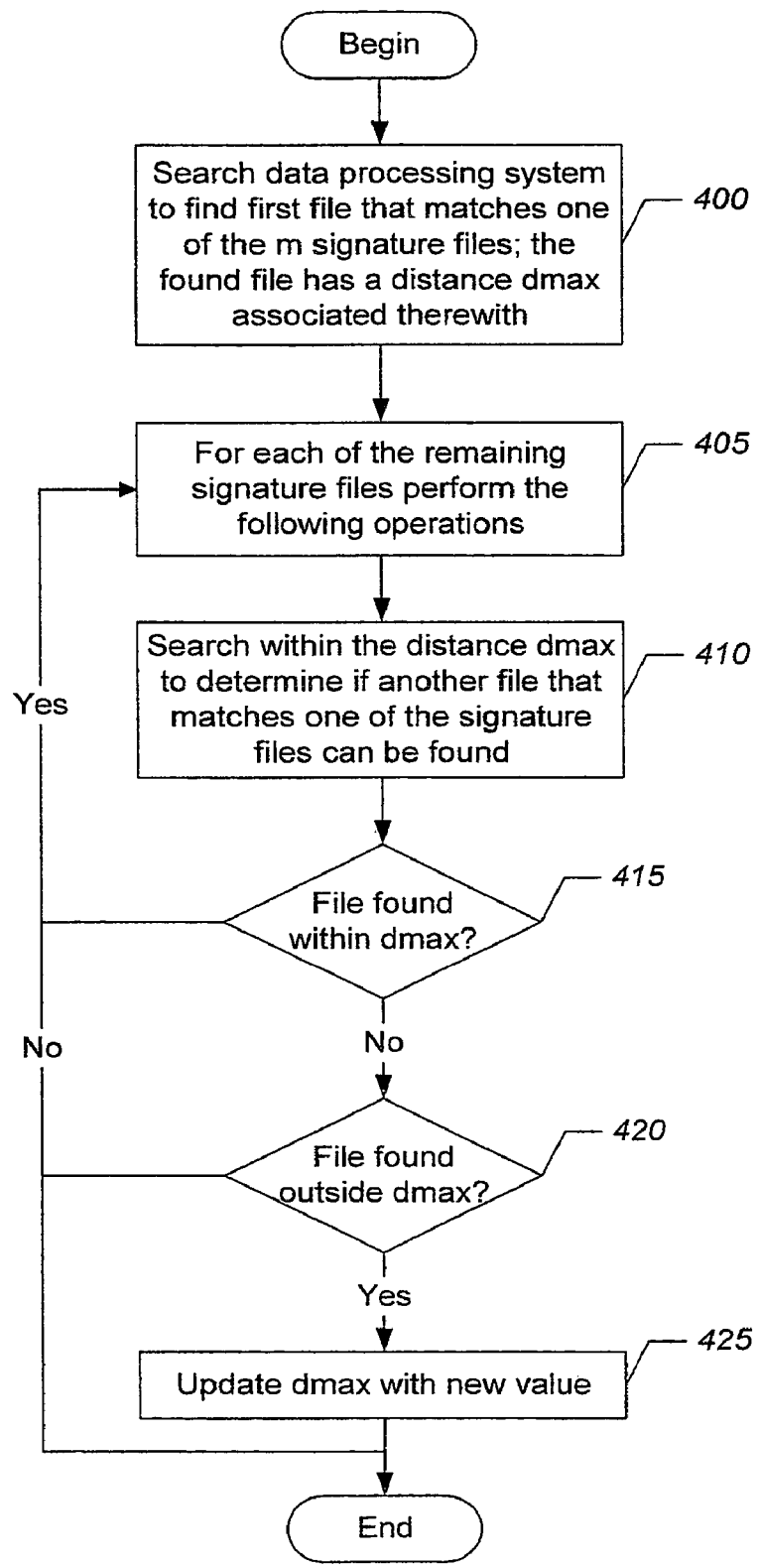

Referring now to FIG. 4, operations for searching the data processing system to find files that match files in the installation signature, in accordance with some embodiments of the present invention, begin at block 400 where the data processing system is searched to find a first file that matches one of the m installation signature files. A distance dmax is associated with this file. A loop begins at block 405 where the data processing system is searched at block 410 within the distance dmax to determine if another file that matches one of the installation signature files can be found. If a file is found within the distance dmax as determined at block 415, then operations continue at block 405; otherwise, a determination is made at block 420 whether the file is found outside the distance dmax. If so, then dmax is updated with a new value at block 425 and operations continue at block 405; otherwise, operations continue at block 405.

The flowcharts of FIGS. 3 and 4 illustrate the architecture, functionality, and operations of some embodiments of methods, systems, and computer program products for detecting the presence of an installation on a data processing system. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and/or 4. For example, two blocks shown in succession may, in fact, be executed substantially concurrently or the blocks may sometimes be executed in the reverse order, depending on the functionality involved.

Embodiments of the present invention may also be illustrated by way of the following examples:

Example 1

Installation signature A {/a/b/c1, /a/b/c2, /a/d}
Data processing system B {/usr/local/b/c1 and /usr/local/b/c2}.
The files found ratio is 2/3=66%
The null transformation results in the following distance calculation for c1:

|  | * | a | b |
|---|---|---|---|
|  | usr | local | b |
|  | --- | --- | --- |
|  | 1 + | 1 + | 0 = 2 |

The same calculation for c2 also yields a distance of 2. Adding the distances for each file gives a total distance of 4 between the signature and the file system under the null transformation. The optimal transformation is one that maps /a to /usr/local. Applying this transformation results in the following transformed signature:
T(A)={/usr/local/b/c1, /usr/local/b/c2, /usr/local/d}
The files found ratio remains 66% and the distance calculation for c1 is as follows:

| usr | local | b |
|---|---|---|
| usr | local | b |
| --- | --- | --- |
| 0 + | 0 + | 0 = 0 |

The same calculation for c2 also yields a distance of 0. Adding the distances for each file gives a total distance of 0, which is an exact match. Thus, the files found ratio is 66%, the structural similarity is 0, and the transformation T={(/a, /usr/local)}.

Example 2

Example 2 is the same as Example 1 with the exception that the data processing system further comprises the file /opt/bin/d. The files found ratio is 100% as all three files c1, c2, and d are found on the data processing system. The transformation remains the same as Example 1, however, because the transformation T must be a partial function, i.e., each path in the domain of T is mapped to exactly one range element. If the transformation T were allowed to map a single domain element to multiple range elements, then every matched file in a signature could be mapped to it's found location on the data processing system and the distances would always be zero. Thus, in this example, d is the only file that contributes to the distance:

| usr | local |
|---|---|
| opt | bin |
| --- | --- |
| 1 + | 1 = 2 |

The files found ratio is 100%, the structural similarity is 2, and the transformation T={/a, /usr/local)}.

Example 3

Installation signature A {/a/b/c1, /a/b/c2, /a/d}
Data processing system B {/usr/local/b/c1 and /usr/local/b/c2, /opt/bin/d, /usr/local/d}
A transformation T={(/a, /usr/local)} results in a structural similarity of zero. This is because the minimum of σ(T(/a/d), /opt/bin/d)=2 and σ(T(/a/d), /usr/local/d)=0 is the contributor to the distance calculation. Thus, the files found ratio is 100%, the structural similarity is 0, and the transformation T={(/a, /usr/local)}.

Example 4

In this example, there are multiple instances of the same file name in the signature. While it may be more common that a single file name in a signature may be found multiple times in a given data processing system, it is possible that a signature may contain multiple instances of the the same file name and that this file may be present just once, or more than once, or not at all, in the data processing system.

Installation signature A {/a/b/c1, /a/b/c2, /e/c1}
Data processing system B {/usr/local/b/c1, /usr/local/b/c2}
Transformation T={(/a, /usr/local) (/e, /usr/local)}.
The contributors to the distance total are:
σ(T(/a/b/c1), /usr/local/b/c1)=0
σ(T(/a/b/c2), /usr/local/b/c2)=0
σ(T(/e/c1), /usr/local/b/c1)=0

This results in a structural similarity of 0. All file names in the installation signature A are found, which results in a files found ratio of 100%. This appears to be a perfect match; however, the files /a/b/c1 and /e/c1 in the installation signature may be distinct files that are stored in distinct locations that happen to have the same name. An alternative interpretation, which may be adopted in accordance with some embodiments of the present invention, is that the installation signature contains c1 twice because c1 might be present in the data processing system in either location. As a result, finding either instance of c1 in the data processing system is sufficient.

It may be the case that two instances of c1 exist in the software application described by the installation signature A. One technique for generating an installation signature for this software application would be to avoid selecting both valid c1 files for inclusion in the signature. If only one of the c1 files is in the signature, then it will be matched against as many c1 files as appear in the data processing system. The best match will contribute to the total distance of the signature to the file system.

Example 5

This example is similar to Example 4 except that the second file c1 in the installation signature is in the same tree as the other file named c1.

Installation signature A {/a/b/c1, /a/b/c2, /a/c1}
Data processing system B {/usr/local/b/c1, /usr/local/b/c2}
Transformation T={(/a, /usr/local)}.
The contributors to the distance total are:
σ(T(/a/b/c1), /usr/local/b/c1)=0
σ(T(/a/b/c2), /usr/local/b/c2)=0
σ(T(/a/c1), /usr/local/b/c1)=3
The last distance calculation may be depicted as follows:

| * | usr | local |
| usr | local | b |
| --- | --- | --- |
| 1 + | 1 + | 1 = 3 |

The distance in the other direction may be calculated by transforming the set B and measuring the distance to the set A as follows: Transformation T={(/usr/local, /a)}. The contributors to the distance total are:
σ(T(/usr/local/b/c1), /a/b/c1)=0
σ(T(/usr/local/b/c2), /a/b/c2)=0
The total distance is 0. The existence of the other file named c1 in the installation signature does not contribute to the total distance. The files found ratio is 100%, the structural similarity is 0, and the transformation T={(/usr/local, /a)}. One interpretation is that the existence of two c1 files in the same tree in the installation signature means that two distinct c1 files must be matched in the same relative position in the data processing system. Another interpretation is that the presence of two instances of the file c1 in the signature means that there are two possible places that the file c1 may be found on the data processing system. Therefore, multiple instances of the same file name may be avoided when generating an installation signature unless there is a deliberate intention to indicate a variety of possible locations for that file on the data processing file on the data processing system.

Example 6

Installation signature A {/a/b/c1, /a/b/c2, /a/b/c3}
Data processing system B {/usr/local/b/c1, /usr/local/b/c2}
Transformation T={(/a, /usr/local)}.
The contributors to the distance total are:
σ(T(/a/b/c1), /usr/local/b/c1)=0
σ(T(/a/b/c2), /usr/local/b/c2)=0
The calculation in the other direction also produces 0; therefore, the structural similarity is 0. The files found ratio, however, is 2/3=66%.

Example 7

Inverting the signature and data processing system sets from Example 6 results in the following:
Installation signature A {/usr/local/b/c1, /usr/local/b/c2}
Data processing system B {/a/b/c1, /a/b/c2, /a/b/c3}
In this example, the structural similarity is 0, but, in contrast to Example 6, the files found ratio is 100% because both c1 and c2 from the installation signature A were matched. The file /a/b/c3 may represent all of the files on the data processing system that are either unrelated to the software whose signature is A or which are part of the same software, but were not chosen for inclusion in its signature.

Many variations and modifications can be made to the preferred embodiments without substantially departing from the principles of the present invention. All such variations and modifications are intended to be included herein within the scope of the present invention, as set forth in the following claims.

That which is claimed:
1. A system for detecting presence of an installation on a data processing system, comprising:
a computer comprising a processor; and
instructions which are executable, using the processor, to perform functions comprising:
providing a signature that comprises m files having paths associated therewith, respectively;
determining a number n files on the data processing system that match files in the signature;
determining a files found ratio given by n/m;
applying a transformation to the signature by replacing at least a portion of at least one of the paths with a new path;
determining a distance between the n files on the data processing system and the m signature files, the distance corresponding to a sum of a number of path segments associated with the m signature files that cannot be matched to a corresponding path segment associated with files on the data processing system, in view of the applied transformation; and if the installation is present on the data processing system based on the files found ratio and the distance.

2. The system of claim 1, wherein the functions further comprise:
determining if the files found ratio is greater than a files found threshold;
wherein determining the distance comprises determining the distance between the n files on the data processing system and the m signature files if the files found ratio is greater than the files found threshold; and
wherein determining if the installation is present comprises determining if the installation is present on the data processing system based on the files found ratio and the distance if the files found ratio is greater than the files found threshold.

3. The system of claim 1, wherein determining if the installation is present comprises:
comparing the files found ratio to a files found threshold;
comparing the distance to a distance threshold; and
determining that the installation is present on the data processing system if the files found ratio exceeds the files found threshold and the distance is less than the distance threshold.

4. The system of claim 3, wherein the functions further comprise:
selecting the files found threshold based on the number of signature files m and/or whether the installation has at least one file associated therewith whose installation is optional.

5. The system of claim 1, wherein determining the number n files on the data processing system that match files in the signature comprises:
searching the data processing system to find a first file that matches a first one of the m signature files, the found file having a distance dmax associated therewith;
searching the data processing system to determine if another file that matches another one of the m signature files can be found within the distance dmax;
ending the search of the data processing system if the other file that matches the other one of the m signature files is found within the distance dmax; and
updating the distance dmax with a value of a distance associated with the other file that matches the other one of the m signature files if the other file is not found within the distance dmax.

6. The system of claim 1, wherein the installation comprises a software program, a firmware program, a documentation file, a printer font, and/or a web file.

7. A computer program product for detecting presence of an installation on a data processing system, comprising:
a non-transitory computer readable storage medium having computer readable program code embodied therein, the computer readable program code comprising:
computer readable program code configured to provide a signature that comprises m files having paths associated therewith, respectively;
computer readable program code configured to determine a number n files on the data processing system that match files in the signature;
computer readable program code configured to determine a files found ratio given by n/m;
computer readable program code configured to apply a transformation to the signature by replacing at least a portion of at least one of the paths with a new path;
computer readable program code configured to determine a distance between the n files on the data processing system and the m signature files, the distance corresponding to a sum of a number of path segments associated with the m signature files that cannot be matched to a corresponding path segment associated with files on the data processing system, in view of the applied transformation; and
computer readable program code configured to determine if the installation is present on the data processing system based on the files found ratio and the distance.

8. The computer program product of claim 7, further comprising:
computer readable program code configured to determine if the files found ratio is greater than a files found threshold;
wherein the computer readable program code configured to determine the distance comprises computer readable program code configured to determine the distance between the n files on the data processing system and the m signature files if the files found ratio is greater than the files found threshold; and
wherein the computer readable program code configured to determine if the installation is present on the data processing system comprises computer readable program code configured to determine if the installation is present on the data processing system based on the files found ratio and the distance if the files found ratio is greater than the files found threshold.

9. The computer program product of claim 7, wherein the computer readable program code configured to determine if the installation is present comprises:
computer readable program code configured to compare the files found ratio to a files found threshold;
computer readable program code configured to compare the distance to a distance threshold; and
computer readable program code configured to determine that the installation is present on the data processing system if the files found ratio exceeds the files found threshold and the distance is less than the distance threshold.

10. The computer program product of claim 9, further comprising:
computer readable program code configured to select the files found threshold based on the number of signature files m and/or whether the installation has at least one file associated therewith whose installation is optional.

11. The computer program product of claim 7, wherein the computer readable program code configured to determine the number n files on the data processing system that match files in the signature comprises:
computer readable program code configured to search the data processing system to find a first file that matches a first one of the m signature files, the found file having a distance dmax associated therewith;
computer readable program code configured to search the data processing system to determine if another file that matches another one of the m signature files can be found within the distance dmax;
computer readable program code configured to end the search of the data processing system if the other file that matches the other one of the m signature files is found within the distance dmax; and
computer readable program code configured to update the distance dmax with a value of a distance associated with the other file that matches the other one of the m signature files if the other file is not found within the distance dmax.

12. The computer program product of claim 7, wherein the installation comprises a software program, a firmware program, a documentation file, a printer font, and/or a web file.

13. A method for detecting presence of an installation on a data processing system, the method executed by a processor of a computer and comprising:

providing a signature that comprises m files having paths associated therewith, respectively;

determining a number n files on the data processing system that match files in the signature;

determining a files found ratio given by n/m;

applying a transformation to the signature by replacing at least a portion of at least one of the paths with a new path;

determining a distance between the n files on the data processing system and the m signature files, the distance corresponding to a sum of a number of path segments associated with the m signature files that cannot be matched to a corresponding path segment associated with files on the data processing system, in view of the applied transformation; and determining if the installation is present on the data processing system based on the files found ratio and the distance.

14. The method of claim 13, further comprising:

determining if the files found ratio is greater than a files found threshold;

wherein determining the distance comprises determining the distance between the n files on the data processing system and the m signature files if the files found ratio is greater than the files found threshold; and wherein determining if the installation is present on the data processing system comprises determining if the installation is present on the data processing system based on the files found ratio and the distance if the files found ratio is greater than the files found threshold.

15. The method of claim 13, wherein determining if the installation is present comprises:

comparing the files found ratio to a files found threshold;

comparing the distance to a distance threshold; and determining that the installation is present on the data processing system if the files found ratio exceeds the files found threshold and the distance is less than the distance threshold.

16. The method of claim 15, further comprising:

selecting the files found threshold based on the number of signature files m and/or whether the installation has at least one file associated therewith whose installation is optional.

17. The method of claim 13, wherein determining the number n files on the data processing system that match files in the signature comprises:

searching the data processing system to find a first file that matches a first one of the m signature files, the found file having a distance dmax associated therewith;

searching the data processing system to determine if another file that matches another one of the m signature files can be found within the distance dmax;

ending the search of the data processing system if the other file that matches the other one of the m signature files is found within the distance dmax; and updating the distance dmax with a value of a distance associated with the other file that matches the other one of the m signature files if the other file is not found within the distance dmax.

18. The method of claim 13, wherein the installation comprises a software program, a firmware program, a documentation file, a printer font, and/or a web file.

* * * * *